US011777601B1

(12) United States Patent
Jones

(10) Patent No.: US 11,777,601 B1
(45) Date of Patent: Oct. 3, 2023

(54) SYSTEMS AND METHODS FOR PROVIDING WIRELESS COMMUNICATIONS TO A DEVICE USING BOTH OPTICAL AND RADIO FREQUENCY TRANSMISSION

(71) Applicant: T-Mobile Innovations LLC, Overland Park, KS (US)

(72) Inventor: David Charles Jones, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 33 days.

(21) Appl. No.: 17/381,422

(22) Filed: Jul. 21, 2021

(51) Int. Cl.
H04B 10/112 (2013.01)
H04B 7/06 (2006.01)
H04W 64/00 (2009.01)

(52) U.S. Cl.
CPC ....... H04B 10/1121 (2013.01); H04B 7/0613 (2013.01); H04B 10/112 (2013.01); H04W 64/006 (2013.01)

(58) Field of Classification Search
CPC ............................................. H04B 10/11–118
USPC ................................................. 398/115–131
See application file for complete search history.

(56) References Cited

U.S. PATENT DOCUMENTS

| 5,585,953 | A | * | 12/1996 | Zavrel | H04B 10/40 |
|---|---|---|---|---|---|
| | | | | | 398/115 |
| 5,870,216 | A | * | 2/1999 | Brock | H04Q 11/0001 |
| | | | | | 398/68 |
| 5,946,120 | A | * | 8/1999 | Chen | H04B 10/11 |
| | | | | | 398/154 |
| 6,889,009 | B2 | * | 5/2005 | Willebrand | H04B 10/07 |
| | | | | | 398/135 |
| 7,336,902 | B1 | * | 2/2008 | Gerszberg | H04B 10/25752 |
| | | | | | 398/115 |
| 7,603,137 | B1 | * | 10/2009 | Elliott | H04L 1/06 |
| | | | | | 398/115 |
| 10,103,812 | B2 | * | 10/2018 | Busche | H04B 7/18502 |
| 10,225,011 | B1 | * | 3/2019 | Schubert | H04B 10/1121 |
| 10,505,631 | B1 | * | 12/2019 | Sundar Pal | H04L 27/26 |
| 10,615,873 | B1 | * | 4/2020 | Behroozi | H04B 7/18504 |
| 10,686,523 | B1 | * | 6/2020 | Gleason | H01Q 21/065 |
| 11,115,119 | B1 | * | 9/2021 | Lee | H04B 7/18526 |
| 2002/0122230 | A1 | * | 9/2002 | Izadpanah | H04B 10/1121 |
| | | | | | 398/118 |
| 2002/0122231 | A1 | * | 9/2002 | Verbana | H04B 10/1121 |
| | | | | | 398/118 |
| 2004/0037566 | A1 | * | 2/2004 | Willebrand | H04B 10/1123 |
| | | | | | 398/115 |

(Continued)

FOREIGN PATENT DOCUMENTS

GB 2580737 A * 7/2020 ........... H04B 10/112

*Primary Examiner* — Li Liu
(74) *Attorney, Agent, or Firm* — SHOOK, HARDY & BACON, L.L.P.

(57) ABSTRACT

Methods and systems for providing wireless communications for a device. The methods can include receiving an indication from a device that the device is capable of receiving data via optical transmission. The methods can also include utilizing an optical transmitter to transmit one or more packets of data to the device via optical transmission. The methods can also include utilizing an antenna element to transmit one or more packets of data to the device via radio frequency (RF) transmission.

20 Claims, 7 Drawing Sheets

(56) References Cited

U.S. PATENT DOCUMENTS

| | | | |
|---|---|---|---|
| 2004/0062551 A1* | 4/2004 | ElBatt | H04B 10/1121 398/115 |
| 2004/0146296 A1* | 7/2004 | Gerszberg | H04B 10/1123 398/12 |
| 2006/0218616 A1* | 9/2006 | Schemmann | H04B 10/2575 725/105 |
| 2008/0044187 A1* | 2/2008 | Krill | H04B 7/18508 398/121 |
| 2011/0069957 A1* | 3/2011 | Kim | H04W 72/08 398/79 |
| 2012/0068880 A1* | 3/2012 | Kullstam | H04B 7/18504 342/81 |
| 2013/0129341 A1* | 5/2013 | D'Errico | H04B 10/032 398/5 |
| 2014/0052814 A1* | 2/2014 | Graham | H04L 67/51 709/217 |
| 2014/0270749 A1* | 9/2014 | Miniscalco | H04B 10/11 398/5 |
| 2014/0376914 A1* | 12/2014 | Miniscalco | H04B 10/1129 398/58 |
| 2015/0098707 A1* | 4/2015 | Pusarla | H04B 10/1121 398/115 |
| 2015/0147067 A1* | 5/2015 | Ryan | H04B 10/116 398/118 |
| 2016/0080086 A1* | 3/2016 | Campos | H04B 10/1121 398/115 |
| 2018/0019807 A1* | 1/2018 | Hreha | H04B 7/18515 |
| 2018/0062740 A1* | 3/2018 | Lange | H04L 67/12 |
| 2018/0227054 A1* | 8/2018 | Hreha | H04J 14/02 |
| 2020/0119811 A1* | 4/2020 | Kay | H04B 10/118 |
| 2021/0344422 A1* | 11/2021 | Shiina | H04B 17/309 |

\* cited by examiner

SYSTEMS AND METHODS FOR PROVIDING WIRELESS COMMUNICATIONS TO A DEVICE USING BOTH OPTICAL AND RADIO FREQUENCY TRANSMISSION

SUMMARY

The present disclosure is directed, in part, to systems and methods for providing wireless communications to a device, substantially as shown in and/or described in connection with at least one of the figures, and as set forth more completely in the claims.

In aspects set forth herein, a device can provide an indication that the device is capable of receiving data via optical transmission. In such aspects, an optical transmitter can be utilized to transmit one or more packets of data to the device via optical transmission. Further, in such aspects, an antenna element can be utilized to transmit one or more packets of data to the device via radio frequency (RF) transmission.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
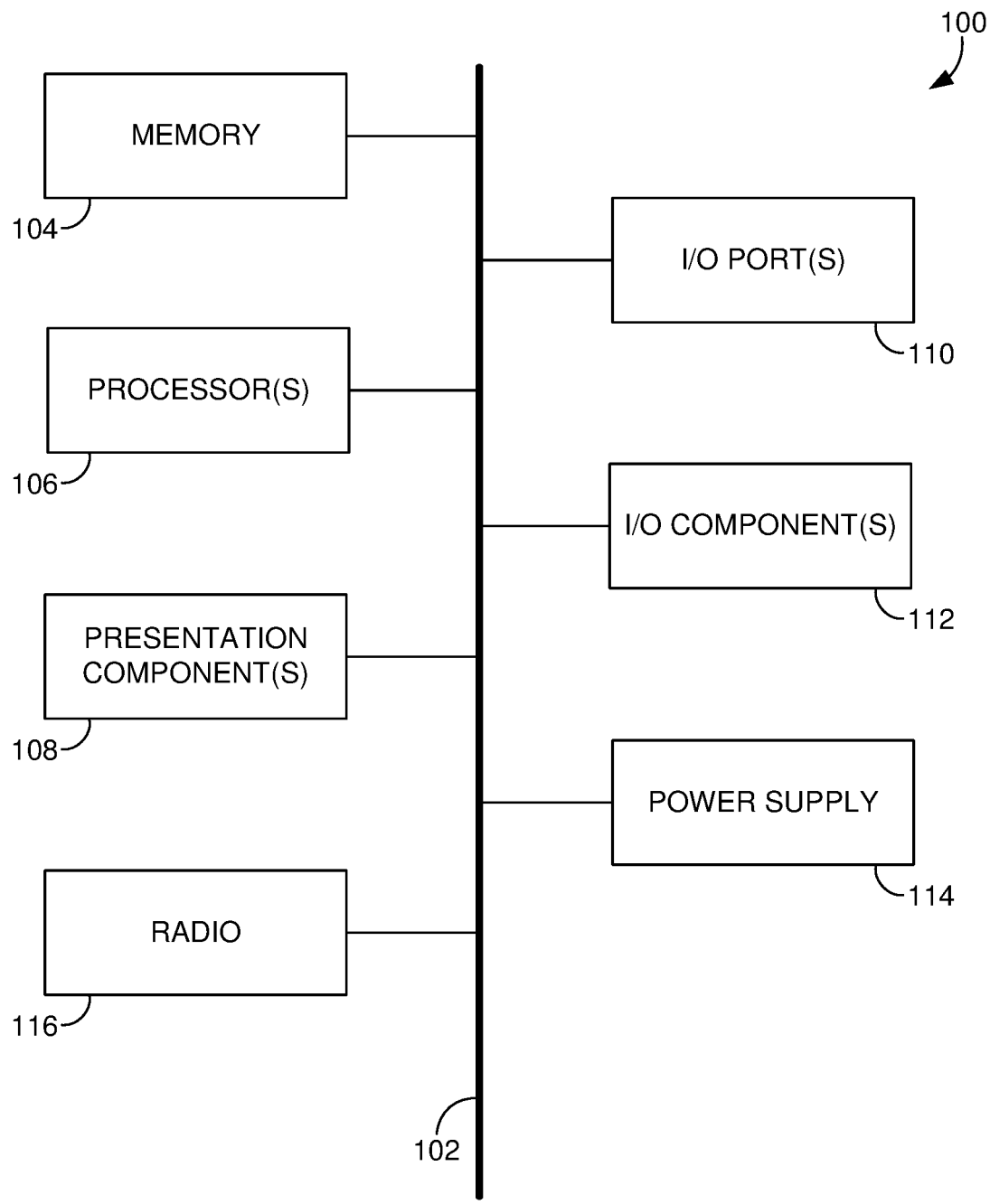
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
gNodeB Next Generation Node B
GIS Geographic/Geographical/Geospatial Information System
GPRS General Packet Radio Service
GPS Global Positioning System
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MD Mobile Device
NR New Radio
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
UMTS Universal Mobile Telecommunications Systems Further, various technical terms are used throughout this description. An illustrative resource that fleshes out various aspects of these terms can be found in Newton's Telecom Dictionary, $31^{st}$ Edition (2018).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, optical, and other wireless media technologies. Combinations of the above are included within the scope of computer-readable media.

By way of background, certain conventional wireless communications systems rely on radio frequency (RF) communications to send and receive data to one or more devices. However, certain current conventional implementations of RF communications systems may not propagate through certain materials, e.g., certain building materials, such as low emissivity glass, leading to reduced quality user experience. Certain conventional implementations of RF communications systems, in various scenarios, also may not have the capacity to handle all data needs of devices connected to the cell site. Thus, there is a need for alternative systems and methods for providing wireless communications to a device.

The systems and methods disclosed herein can alleviate one or more of the aforementioned problems. For example, in aspects, the systems disclosed herein can utilize both optical and RF communications. In such aspects, the systems and methods disclosed herein can leverage the use of both optical and RF transmission to provide increased bandwidth and reliability of communications or data to a device. In certain aspects, the systems and methods disclosed herein may utilize optical transmission for non-critical communications, e.g., video downloads, web browsing, etc., which may reduce capacity on a cell site's RF resources, freeing up RF resources for critical communications, such as voice calls, live video streaming, or text messaging. Further, in certain aspects, the systems and methods described herein can use optical and RF transmission to complement one another e.g., utilize optical transmission when there is reduced RF signal strength, and/or utilize RF transmission when optical transmission is not available. In such aspects, as discussed below, this complementary use of RF and optical transmission can provide enhanced coverage in certain areas that may pose a challenge using current conventional RF systems.

Accordingly, in one aspect, a system for providing wireless communications for a device is provided. The system includes at least one antenna array comprising a plurality of antenna elements; at least one optical array comprising a plurality of optical transmitters; and a processor. The processor is configured to execute operations that can include receiving a first indication, at a first time, that a device is capable of receiving data via optical transmission. The operations can further include utilizing an optical transmitter of the plurality of optical transmitters to transmit one or more first packets of data to the device via optical transmission; and utilizing an antenna element of the plurality of antenna elements to transmit one or more second packets of data to the device via radio frequency (RF) transmission.

In another aspect, a method for providing wireless communications for a device is provided. The method can include receiving a first indication, at a first time, that a device is capable of receiving data via optical transmission. The method can further include utilizing an optical transmitter to transmit one or more first packets of data to the device via optical transmission. Additionally, the method can include utilizing an antenna element to transmit one or more second packets of data to the device via radio frequency (RF) transmission.

As used herein, user equipment (UE) (also referenced herein as a user device or device) can include any device employed by an end-user to communicate with a wireless telecommunications network. A UE can include a mobile device, a mobile broadband adapter, an IoT device, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 100 described herein with respect to FIG. 1.

Referring to FIG. 1, a diagram is depicted of an example computing environment suitable for use in implementations of the present disclosure. In particular, the example computing environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: memory 104, one or more processors 106, one or more presentation components 108, input/output (I/O) ports 110, I/O components 112, a power supply 114, and a radio 116. The bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of the I/O components 112. Also, processors, such as one or more processors 106, have memory. The present disclosure recognizes that such is the nature of the art, and reiterates that FIG. 1 is merely illustrative of an example computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

The computing device 100 typically includes a variety of computer-readable media. Computer-readable media can be any available media that can be accessed by the computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

The memory 104 includes computer-storage media in the form of volatile and/or nonvolatile memory. The memory 104 may be removable, nonremovable, or a combination thereof. Exemplary memory includes solid-state memory, hard drives, optical-disc drives, etc. The computing device 100 includes one or more processors 106 that read data from various entities such as bus 102, the memory 104 or the I/O components 112. One or more presentation components 108 presents data indications to a person or other device. Exemplary one or more presentation components 108 include a display device, speaker, printing component, vibrating component, etc. The I/O ports 110 allow the computing device 100 to be logically coupled to other devices including the I/O components 112, some of which may be built in the computing device 100. Illustrative I/O components 112 include a microphone, joystick, game pad, satellite dish, scanner, printer, wireless device, etc.

The radio 116 represents a radio that facilitates communication with a wireless telecommunications network. Illustrative wireless telecommunications technologies include CDMA, GPRS, TDMA, GSM, and the like. The radio 116 might additionally or alternatively facilitate other types of wireless communications including Wi-Fi, WiMAX, LTE, 5G NR, or other VoIP communications. As can be appreciated, in various embodiments, the radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
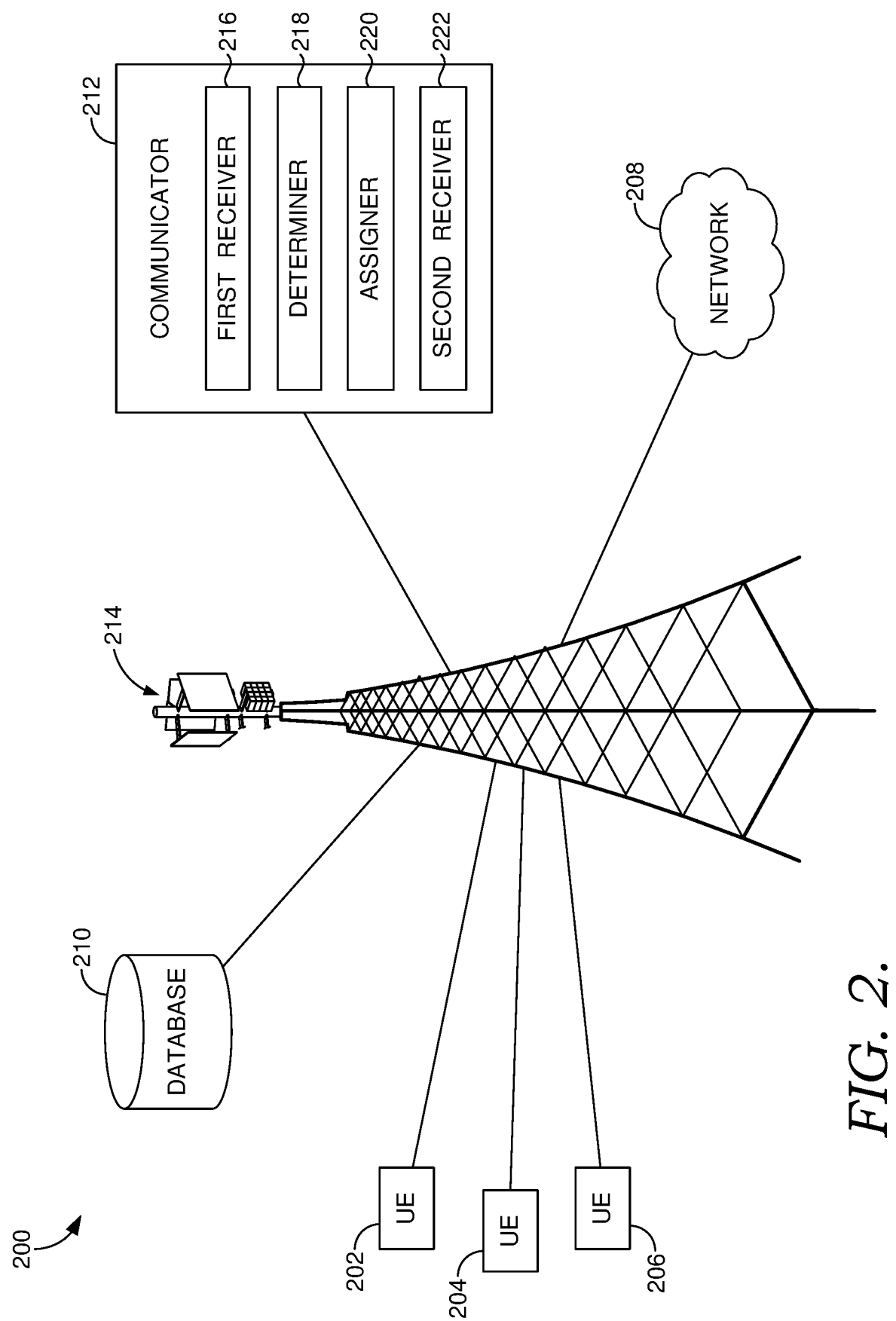
FIG. 2 illustrates a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment be interpreted as having any dependency or requirement relating to any one or combination of components illustrated.

The network environment 200 of FIG. 2 includes user devices 202, 204, and 206, a cell site 214, a network 208, a database 210, and a communicator 212. In the network environment 200, the user devices 202, 204, and 206 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, an IoT device, a video player, a handheld communications device, a workstation, a router, an access point, or any combination thereof, or any other device that communicates via wireless communications with a cell site, e.g., the cell site 214, in order to interact with a public or private network.

In some aspects, the user devices 202, 204, and 206 can correspond to the computing device 100 of FIG. 1. Thus, in aspects, a user device can include, for example, a display(s), a power source(s) (e.g., a battery), a data store(s), a speaker(s), memory, a buffer(s), a radio(s) and the like. In some implementations, a user device, e.g., one or more of the user devices 202, 204, and 206, comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. In certain aspects, as discussed further, below, user devices can also include an optical receiver and/or an optical transmitter.

In some aspects, the user devices 202, 204, and 206 in the network environment 200 can optionally utilize the network 208 to communicate with other computing devices (e.g., a mobile device(s), a server(s), a personal computer(s), etc.) through the cell site 214, e.g., using any one of a plurality of wireless RF communication protocols, such as 3G, 4G/LTE, 5G, 6G, and other related protocols. In aspects, the network 208 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components)

can provide connectivity in various implementations. The network 208 can include multiple networks, as well as being a network of networks, but is shown in more simple form so as to not obscure other aspects of the present disclosure.

The network 208 can be part of a telecommunication network that connects subscribers to their immediate service provider. In some instances, the network 208 can be associated with a telecommunications provider that provides services (including, for example, but not limited to, 5G and LTE) to user devices, such as the user devices 202, 204, and 206. For example, the network 208 may provide voice, SMS, and/or data services to user devices or corresponding users that are registered or subscribed to utilize the services provided by a telecommunications provider. The network 208 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, or a combination thereof.

In some aspects, the cell site 214 can be configured to communicate with user devices, such as the user devices 202, 204, and 206 that are located within the geographical area, or cell, covered by the cell site 214, or associated radio antennas and/or optical transmitters. The cell site 214 may include one or more base stations, base transmitter stations, radios, antennas, antenna arrays, optical arrays, power amplifiers, transmitters/receivers, digital signal processors, control electronics, GPS equipment, and the like. In an aspect, the cell site 214 of the present disclosure may communicate with at least one user device, such as the user device 202, via a wireless RF communication protocol (e.g., 5G wireless communication protocol), and/or via optical transmission.

As shown, the cell site 214 is in communication with the communicator 212, which comprises various components that are utilized, in various implementations, to perform one or more methods for providing wireless communications for a device, e.g., one or more of the user devices 202, 204, or 206. In aspects, the communicator 212 includes a first receiver 216, a determiner 218, an assigner 220, and a second receiver 222. However, in other implementations, more or less components than those shown in FIG. 2 may be utilized to carry out aspects of the systems and methods described herein. Each of the components or sub components of the communicator 212 may be a stand-alone or combined processor, server, or other computer processing component that is suitably configured to perform the operations described herein.

In various aspects, the first receiver 216 of the communicator 212 is generally responsible for receiving information associated with one or more devices, e.g., the user devices 202, 204, and/or 206. In aspects, the information received by the first receiver 216 can include an indication or communication from a user device that the device is capable of receiving data via optical transmission. In certain aspects, the indication or communication can be transmitted by the device to the first receiver 216 via RF transmission. In various aspects, the indication or communication from the device to the first receiver 216 can include a wavelength or wavelength range over which the device is capable of receiving communications from the cell site 214. In the same or alternative aspects, the indication or communication from the device to the first receiver 216 can include information associated with a specific optical transmitter of an optical array, e.g., optical beam direction, orientation, or index information, from which the device is capable of receiving data. In aspects, such information associated with a specific optical transmitter informs the communicator 212 which direction and/or orientation to direct the optical transmission to the device, and/or which specific optical transmitter to utilize for such communication. In the same or alternative aspects, the indication or communication from the device to the first receiver 216 can include location information associated with the device, e.g., GPS coordinates, altitude information, etc.

In various aspects, the indication or communication from the device to the first receiver 216 can include information associated with the requested data for transmission to the device. For instance, the indication or communication can include identifying information associated with the requested data, e.g., voice call, video download, web browsing, live video download, etc. It should be understood that the indication or communication from the user device communicated to the first receiver 216 can include multiple communications and/or can be repeated over any desired time interval to ensure continued connectivity.

In various aspects, the first receiver 216 can receive information from the database 210. In aspects, the first receiver 216 can receive any information from the database 210 that can facilitate effective communication between the cell site 214 and the user device. In certain aspects, such information may include account information associated with the user device, and/or information associated with the specific make and model of the user device. In the same or alternative aspects, the information from the database 210 may include any information associated with prior optical transmissions to a specific location where the user device is, e.g., GPS coordinates, optical beam direction, and/or orientation.

In aspects, the determiner 218 can determine whether or not the cell site 214 will send data via optical transmission to the user device. In such aspects, the determiner 218 can determine that the user device is capable of receiving data via optical transmission, e.g., based on the receipt via the first receiver 216 of an indication to that effect from the user device. In the same or alternative aspects, the determiner 218 can determine that the cell site 214 is capable of sending data via optical transmission to the user device. In such aspects, the determiner 218 can determine that one or more optical transmitters are capable of transmitting data to the user device, e.g., that such transmitters are functioning and available, and are capable of orienting to the user device.

In various aspects, the determiner 218 can determine if all or a portion of the requested data should be transmitted to the user device via optical transmission, RF transmission, or both. For example, the determiner 218 can determine whether or not the requested data is associated with non-critical communications. In aspects, non-critical communications can include data associated with video downloads, picture downloads, audio downloads, website browsing, or a combination thereof. In aspects, when the data requested by the user device is associated with non-critical communications, the determiner 218 can determine that such data will be communicated to the user device via optical transmission. In the same or alternative aspects, the determiner 218 can determine whether or not the requested data is associated with critical communications. In aspects, critical communications can include data associated with a voice call, text messaging, live video download and/or streaming, or a combination thereof. In aspects, when the data requested by the user device is associated with critical communications, the determiner 218 can determine that such information is to be communicated to the user device via RF transmission.

In aspects, the assigner 220 can assign a specified mode of data transmission for all or a portion of the data requested by the device. In aspects, the assigner 220 can assign a mode of data transmission, e.g., optical transmission or RF transmission, that was determined by the determiner 218 for all or a portion of the data requested by the device. For instance, when the determiner 218 determines that requested data to be sent to the device will be communicated via optical transmission, the assigner 220 can assign the mode of optical transmission for communicating that requested data to the device. In the same or alternative aspects, when the determiner 218 determines that requested data to be sent to the device will be communicated via RF transmission, the assigner 220 will assign the mode of RF transmission for communicating that requested data to the device. In aspects, the assigner 220 may also cause the transmission of the requested data using the assigned mode of transmission.

In various aspects, the second receiver 222 can receive information from a device in communication or initiation of communication with the cell site 214. In aspects, the second receiver 222 can receive data uploads from the device, e.g., to the network 208. In certain aspects, the second receiver 223 can receive data from the device via optical transmission from the device. In various aspects, a user device may utilize optical transmission to upload video, images, music, or the like, to the network 208.

Figure 3:
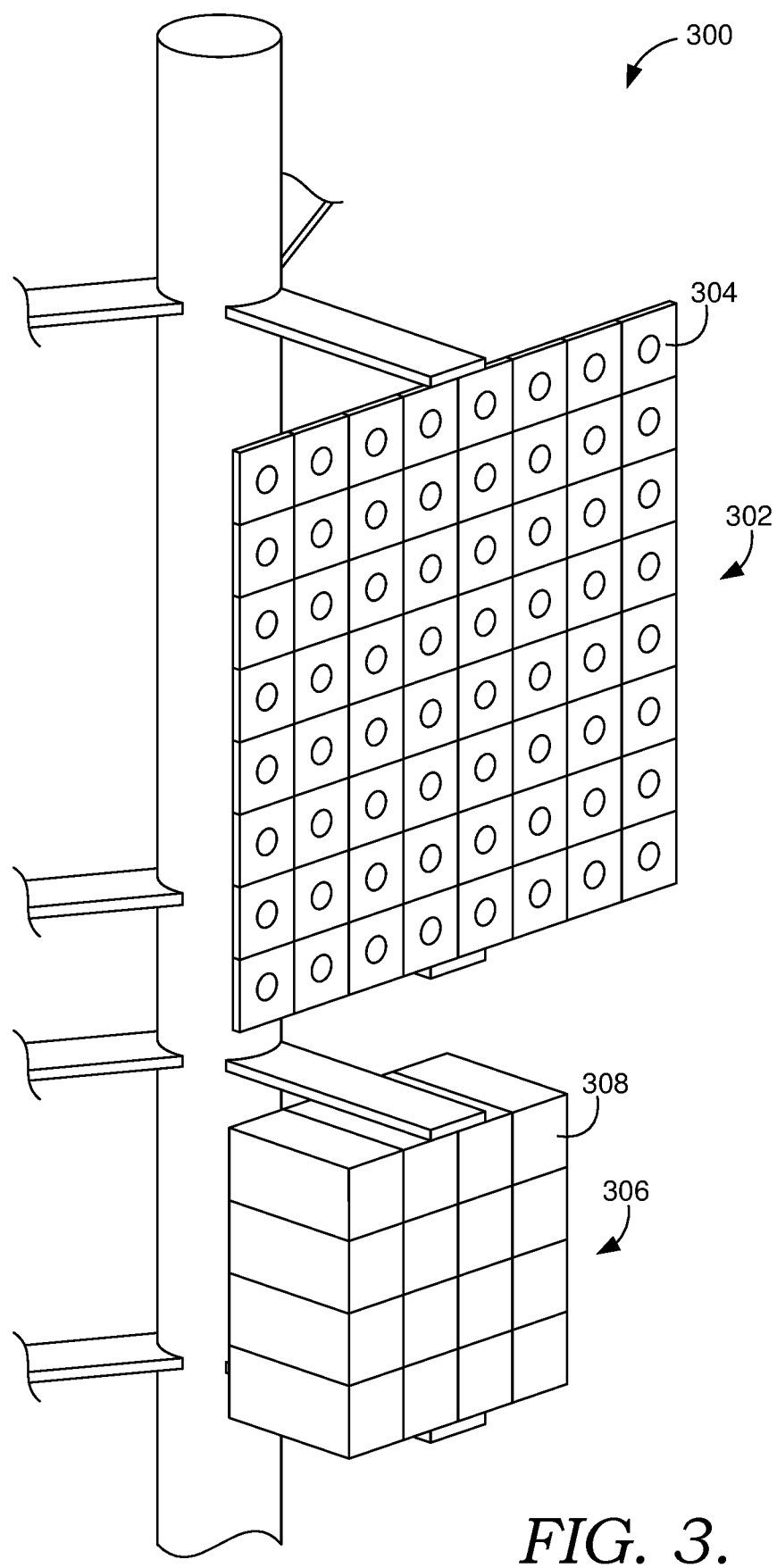
FIG. 3 depicts a schematic representation of a base station suitable for use in aspects of the present disclosure.

FIG. 3 depicts an example base station configuration suitable for use in implementing embodiments of the present disclosure and is designated generally as base station 300. Base station 300 is but one example of a suitable configuration and is not intended to suggest any limitations as to the scope of use or functionality of embodiments described herein. Neither should the configuration be interpreted as having any dependency or requirement relating to any one or combination of components illustrated.

In the aspect depicted in FIG. 3, the base station 300 includes an antenna array 302 and an optical array 306. It should be understood that the base station 300 may include additional antenna arrays and optical arrays, e.g., that are positioned to face different directions than the antenna array 302 and/or the optical array 306 face.

As can be seen in the aspect depicted in FIG. 3, the antenna array 302 includes one or more antenna elements 304. In aspects, the one or more antennas 304 may be dipole antennas, having a length, for example, of ¼, ½, 1, or 1½ wavelength. In aspects, the antenna array 302 may be an active antenna array, FD-MIMO, massive MIMO, 3G, 4G, 5G, 6G, and/or 802.11. While we refer to dipole antennas herein, in other aspects, the antenna may be monopole, loop, parabolic, traveling-wave, aperture, yagi-uda, conical spiral, helical, conical, radomes, horn, and/or apertures, or any combination thereof. It is noted that adjusting one or more individual power supplies to antenna elements of an antenna array may be broadly applicable to an antenna array comprising any type of antenna targeting any portion of the RF spectrum (though any lower than VHF may be size prohibitive). In one aspect, the antenna may be configured to communicate in the UHF and/or SHF spectrum, for example, in the range of 1.3 GHz to 30 GHz.

It should be understood that the antenna array 302 is schematically depicted and any number of individual antenna elements in any arrangement is contemplated by the disclosure herein. For example, in the aspect depicted in FIG. 3, the antenna array 302 includes 64 individual antenna elements 304 arranged in an 8×8 structure, it is contemplated that the antenna array 302 may include antenna elements arranged in a 8×4 structure, 4×8 structure, or 4×4 structure, as some non-limiting examples. In aspects not depicted in the figures, each antenna element 304 may comprise a dedicated power supply, which can supply power having a certain phase and amplitude to a respective antenna element 304. In an aspect, the power supply may include a power amplifier. In aspects also not depicted in the figures, the base station 300 may include a processor.

In aspects, the optical array 306 includes one or more optical transmitters 308. The optical transmitters can transmit in the UV spectrum, visible light spectrum, infrared spectrum, or a combination thereof, in aspects. In various aspects, the one or more optical transmitters 308 can comprise a laser, LED, or a combination thereof. In alternative aspects, the one or more optical transmitters 308 can be any type of optical transmitter, e.g., optical transmitters other than a laser or LED. In the same or alternative aspects, the one or more optical transmitters 308 can be coupled to a power supply. In one aspect, the one or more optical transmitters 308 can include components of a Li-Fi transmission system, free space optical transmission system, or a combination thereof.

In the aspect depicted in FIG. 3, the one or more optical transmitters 308 are depicted in a 4×4 grid, with 16 total optical transmitters. It should be understood that the shape, arrangement, and number of optical transmitters depicted in FIG. 3 is just a schematic depiction and any shape, arrangement, and number of optical transmitters is contemplated for use in the present system and methods disclosed herein.

Figure 4B:
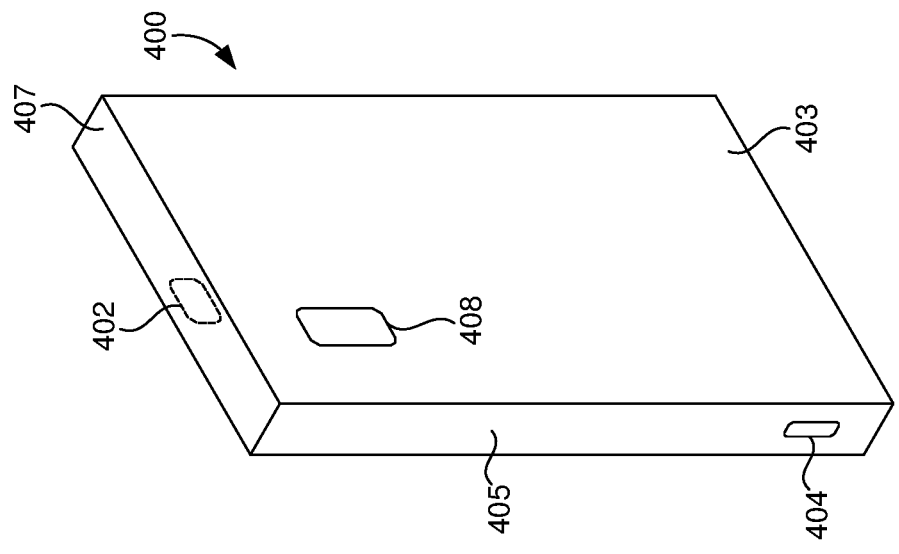
FIGS. 4A and 4B depict a schematic representation of a device suitable for use in aspects of the present disclosure.
Figure 4A:
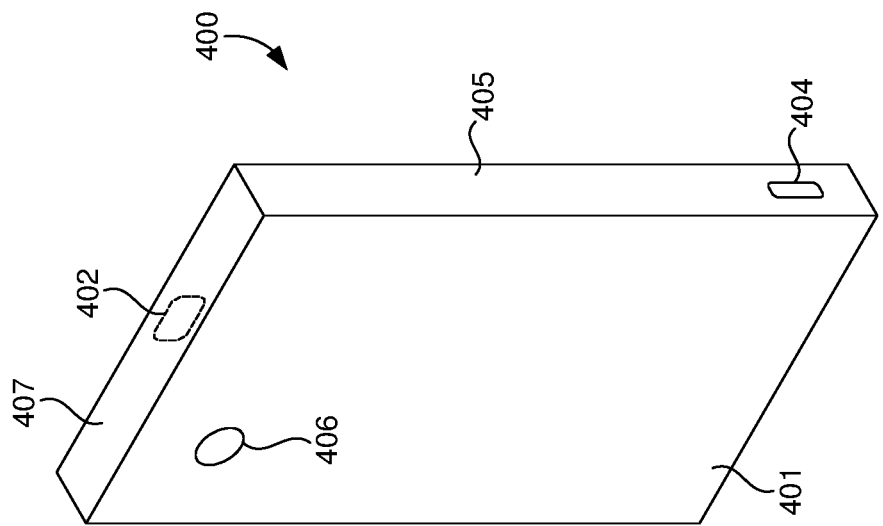

FIGS. 4A and 4B schematically depict a user device 400 contemplated for use in the systems and methods disclosed herein. It should be understood that the user device 400 is just one example schematic depiction of a user device. In the aspect depicted in FIGS. 4A and 4B, the user device 400 is depicted as a mobile personal computing device; however, it should be understood that other types of user devices are also contemplated for use in the methods and systems disclosed herein.

In the aspect depicted in FIGS. 4A and 4B, the user device 400 includes a plurality of optical receivers for receiving optical transmissions from a base station, e.g., the base station 300 of FIG. 3 and/or the cell site 214 of FIG. 2. Particularly, in the aspect depicted in FIG. 4A, the user device 400 includes an optical receiver 406 positioned on a first side 401 of the user device 400, and another optical receiver 404 positioned on a side 405 of the user device 400. As best seen in the aspect depicted in FIG. 4B, the user device 400 can also include an optical receiver 408 on a second side 403. In various aspects, by having a plurality of optical receivers positioned on various faces and/or sides of the user device 400, the user device 400 is better configured to receive optical transmissions no matter the specific orientation and/or position of the user device 400. In aspects, the optical receivers 404, 406, and 408 can be any convenient type of optical receivers. In certain aspects, the optical receivers 406 and/408 can also function as a camera.

In certain aspects, the user device 400 can optionally include an optical transmitter, e.g., for uploading data to the cell site and/or network. As can be seen in the aspect depicted in FIGS. 4A and 4B, the user device 400 is depicted as having an optional optical transmitter 402 positioned on a side 407 of the user device 400. In aspects, the optical transmitter 402 can be any convenient type of optical transmitter, and can include an infrared transmitter, visible light transmitter, or UV transmitter, including but not limited to a laser and/or an LED.

Figure 5:
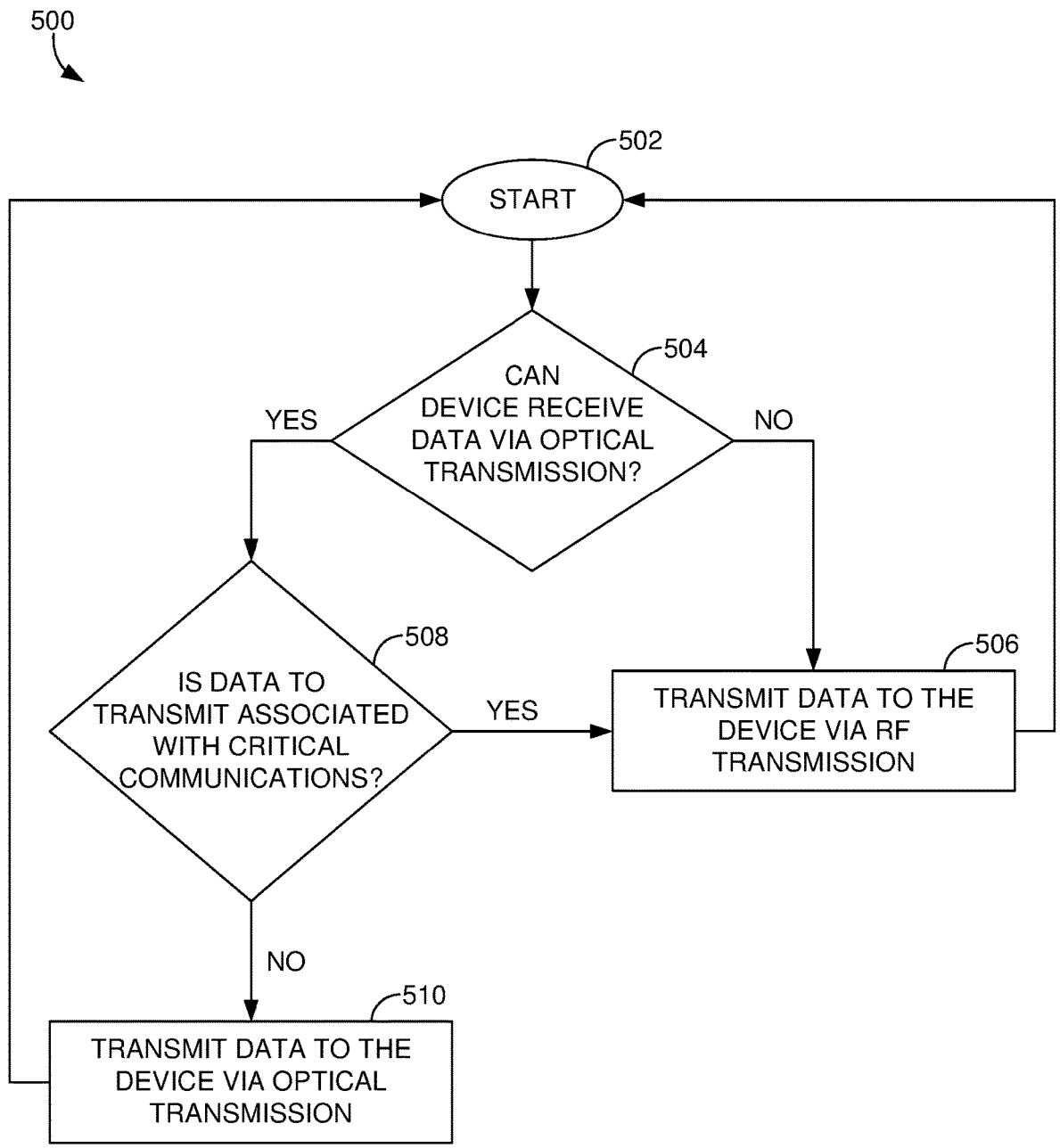
FIG. 5 depicts a flow diagram of an exemplary method for providing wireless communications for a device, in accordance with aspects of the present disclosure.

FIG. 5 schematically depicts one example method 500 for providing wireless communications for a device. The method starts at the step 502, where a user device attempts to communicate with a network, e.g., the network 208 depicted in FIG. 2. At the step 504, it is determined if the device can receive data via optical transmission. In aspects, the step 504 can be performed by the communicator 212 and/or the determiner 218 of the network environment 200 depicted in FIG. 2. In one aspect, the step 504 can include confirming that the device has communicated to the network and/or to the cell site that the device is capable of receiving data via optical transmission. In aspects, such a confirmation can include the first receiver 216 of the communicator 212 of the network environment 200 depicted in FIG. 2 receiving an indication or communication from the device regarding the ability of the device to receive data via optical transmission. In the same or alternative aspects, the step 504 can include receiving the desired wavelength and other information for successfully communicating data via optical transmission to the device. When it is determined that the device cannot receive data via optical transmission and/or it is determined that the cell site does not have the current available resources to provide data via optical transmission to the device, the requested data is transmitted to the device via RF transmission at the step 506. In aspects, once the device receives the requested data in the step 506, the device may return to the step 502 to request further data and/or to transmit data to the network.

If it is determined at the step 504 that the device is capable of receiving data via optical transmission, and/or that the cell site has the current available resources to provide data via optical transmission, the method 500 proceeds to the step 508. In the step 508, it is determined if the data to be transmitted to the device is associated with critical communications. For instance, as discussed above, in aspects, the cell site and/or network may prioritize sending critical communications to devices via RF transmission. In aspects, as discussed above, certain example critical communications include voice calls, text messages, live video, or a combination thereof. In the method 500 depicted in FIG. 5, when the requested data is considered to be critical communications, the method proceeds to the step 506, where such data is transmitted to the device via RF transmission. When the requested data is non-critical communications, e.g., data associated with a video download, picture download, audio download, website browsing, or a combination thereof, the method 500 proceeds to the step 510. In aspects, the determiner 218 of the communicator 212 of the network environment 200 depicted in FIG. 2 can be utilized to perform at least a portion of the determinations made in the step 508. In aspects, once it is determined what transmission mode is to be utilized, the requested data can be assigned such a transmission mode by the assigner 220 of the communicator 212 of the network environment 200 depicted in FIG. 2.

In the step 510, the requested data is transmitted via optical transmission. In aspects, the optical array 306 of the base station 300 depicted in FIG. 3 can be utilized to provide data to the device via optical transmission. In aspects, once the device receives the requested data in the step 508, the device may return to the start 502 to request further data and/or to transmit data to the network.

In aspects, by transmitting non-critical data or any data via optical transmission, there is enhanced user experience, as optical transmission has increased bandwidth and download speeds compared to current RF technologies, e.g., 5G. Further, in aspects, utilizing optical transmission for non-critical data transmission frees up bandwidth and/or capacity on the RF side of the network and/or cell site.

It should be understood that the method 500 depicted in FIG. 5 is just one example method and that variations on this method are also contemplated by the disclosure herein. For instance, in one variation of an example method, the step 508 is not included, in certain aspects. In such a variation on an example method, any requested data, both critical and non-critical communications, can be provided to the device via optical transmission.

Figure 6:
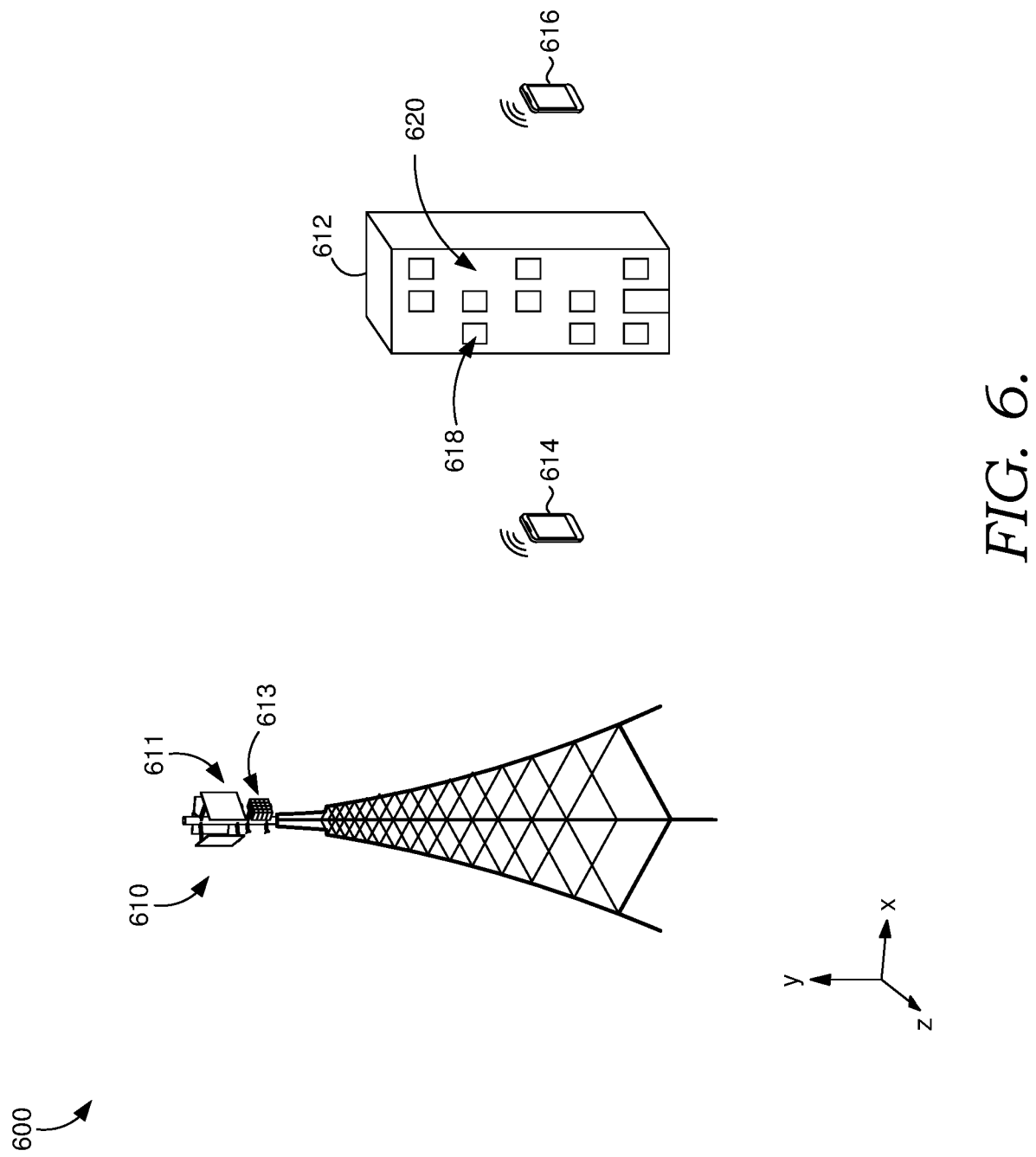
FIG. 6 depicts a system that includes a base station, and further depicts user devices positioned in various spots, as well as in various positions of a building, in accordance with aspects of the present disclosure.

FIG. 6 depicts an example network environment 600, where various non-limiting example scenarios are depicted, for the use of the systems and methods for providing wireless communications for a device disclosed herein. In the aspect depicted in FIG. 6, a network environment 600, a base station 610, a building 612, and user devices 614 and 616 are depicted. In one aspect, the base station 610 can include any or all of the properties of the base station 300 discussed above with reference to FIG. 3. Further, the network environment 600 can include any or all of the properties of the network environment 200 discussed above with reference to FIG. 2.

In the aspect depicted in FIG. 6, the user device 614 is positioned within a line of sight of the base station 610. In such aspects, when a user device is positioned within a line of sight of the base station 610, the user device 614 is positioned within a line of sight of one or more antenna arrays 611 and/or one or more optical arrays 613 of the base station 610. In aspects, a user device can be considered positioned within a line a line of sight of a base station when there is no physical objects in-between the user device and the base station that may disrupt the optical transmission of data between the user device and the base station, e.g., no trees, no buildings, and/or no or other structures. In the aspect depicted in FIG. 6, since the user device 614 is positioned within a line of sight of the base station 610, the user device can receive data via optical transmission from the base station 610, and/or transmit via optical transmission data from the user device 614 to the base station 610.

In the aspect depicted in FIG. 6, the user device 616 is depicted as not being in line of sight with the base station 610. In this aspect, a building 612 is depicted as blocking or disrupting the line of sight between the user device 616 and the base station 610. In aspects, since the user device 616 is not in line of sight with the base station 610, the user device 616 can communicate with the base station 610 via RF communication. In the same or alternative aspects, the user device may move from behind the building 612 and then be in line of sight with the base station 610 where the user device 616 may then receive and/or transmit data via optical transmission with the base station 610.

In certain aspects, a user device may be able to receive data via optical transmission while in a structure, such as a building. For instance, in certain aspects, when a user device is positioned at or near a window, e.g., at the position identified by the arrow 618, when inside the building 612, such a user device may have a line of sight to the base station 610 and can be capable of receiving and/or sending data via optical transmission. In such aspects, the methods and systems disclosed herein can provide increased connectivity to users in various circumstances. For example, in various aspects, certain RF wireless communication protocols, e.g., 5G, may have reduced signal strength when a low emissivity (Low-E) window is in between a user device and a base station. In the scenario where the window by the position identified by the arrow 618 in the building 612 is a Low-E window, a user may have reduced RF communication capabilities, yet the user's device may be able to utilize optical transmission to receive and/or send data. In such an aspect, the network environment 600 is capable of utilizing optical transmission to reduce a potential deficiency in the RF transmission capabilities.

In one or more aspects, a user device positioned inside the building 612 but away from a window, e.g., at the position identified by the arrow 620, may not have line of sight to the base station 610. In such an aspect, the user device may transmit and/or receive data from the base station 610 via RF transmission, which is capable of effective communication even in the absence of line of sight between the base station 610 and a user device. In one scenario, a user device may move around within the building 612, e.g., between the positions represented by the arrows 618 and 620, and may rely on optical transmission, e.g., when at the position represented by the arrow 618, and may rely on RF transmission, e.g., when at the position represented by the arrow 620, for communication with the base station 610.

Figure 7:
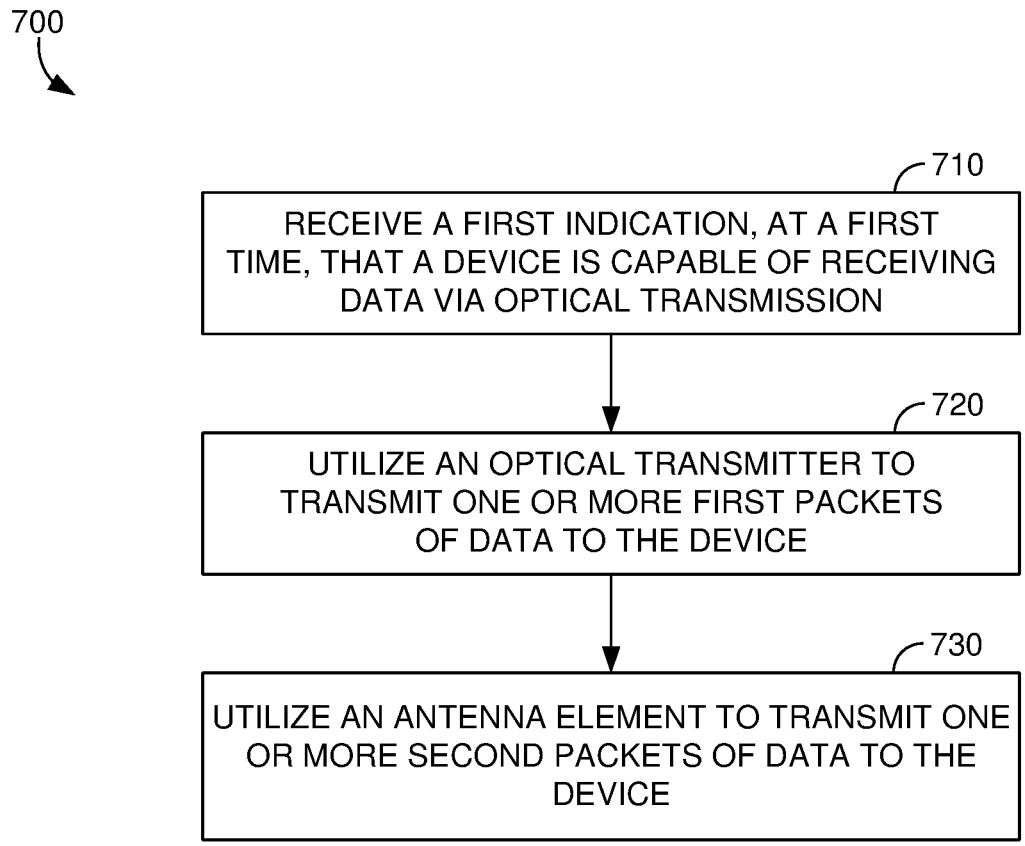
FIG. 7 depicts a flow diagram of an exemplary method for providing wireless communications for a device, in accordance with aspects of the present disclosure.

FIG. 7 is a flow chart of a method 700 for providing wireless communications for a device. In the step 710 of the method 700, a first indication is received, at a first time, that a device is capable of receiving data via optical transmission. In various aspects, at the first time, the device can have a direct line of sight to an optical array and/or to a base station. In aspects, the first indication can be received by the first receiver 216 of the communicator 212 of the network environment 200 discussed above with reference to FIG. 2. In aspects, the first indication can be communicated from the device using RF transmission. In one or more aspects, the first indication can include a specified wavelength for optical transmission.

In the step 720 of the method 700, an optical transmitter is utilized to transmit one or more first packets of data to the device. In aspects, the optical transmitter can include a laser, LED, or a combination thereof. In various aspects, the one or more first packets of data can be associated with non-critical communications. In aspects, the non-critical communications can include data associated with a video download, picture download, audio download, website browsing, or a combination thereof. In aspects, the assigner 220 of the network environment 200 discussed above with reference to FIG. 2 may assign the one or more first packets of data to be transmitted by optical transmission and/or may cause the optical transmission of the one or more first packets of data.

In various aspects, prior to the step 720, the method 700 can include a step of determining whether or not the cell site will send data via optical transmission to the user device and/or determining if all or a portion of the requested data should be transmitted to the device via optical transmission. In such aspects, such an additional step may be performed by the determiner 218 of the communicator 212 of the network environment 200 discussed above with reference to FIG. 2. For example in certain aspects, such an additional step can include determining if the requested data is associated with non-critical communications and that such data should be provided via optical transmission.

In the step 730 of the method 700, an antenna element is utilized to transmit one or more second packets of data to the device via RF transmission. In one aspect, the RF transmission can include one or more RF wireless communication protocols, such as a 3G, 4G, 5G, LTE, CDMA, 6G, or a combination thereof. In aspects, the one or more second packets of data can be associated with critical communications, including but not limited to a voice call, text messaging, live video, or a combination thereof. In certain aspects, the step 730 and the step 720 can occur at the same time or the step 730 can occur before the step 720 (or even before the step 710), or at substantially the same time, or within 10 seconds, or 5 seconds, or 1 second of one another. In the same or alternative aspects, the step 720 and the step 730 can occur while the user device is in substantially the same location, e.g., within a 3 or 5 meter radius. It should be understood that the terms first packets of data and second packets of data do not imply an order to which such packets of data are transmitted. For instance, as discussed above, in certain aspects, the step 730 where an antenna element may be utilized to transmit one or more second packets of data via RF transmission, may occur prior to (or at the same time as) the step 720, where an optical array is utilized to transmit one or more first packets of data.

In aspects, prior to the step 730 of the method 700, a second indication can be received, at a second time, that the device is not capable of receiving data via optical transmission. In such aspects, the second indication can be received by the first receiver 216 of the communicator 212 of the network environment 200 discussed above with reference to FIG. 2. In various aspects, at the second time, the device may not have a direct line of sight to an optical array and/or to a base station. In certain aspects, at the second time, the device may be at a location that is different from the location the device is at, at the first time. In one or more aspects, the second indication can be communicated from the device using RF transmission. In aspects, the step 730 can be performed in response to receiving such a second indication that the device is not capable of receiving data via optical transmission.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:
1. A system for providing wireless communications for a device, the system comprising:
   at least one antenna array comprising a plurality of antenna elements;
   at least one optical array comprising a plurality of optical transmitters; and
   a processor configured to execute operations, comprising:
      receiving a first indication, at a first time, that a device is capable of receiving data via optical transmission and including information identifying a type of data communication requested by the device;
      utilizing the type of data requested by the device, determining one or more first packets of data of a first type of data to communicate to the device via optical transmission, wherein the first type of data is associated with non-critical communications;
      utilizing the type of data requested by the device, determining one or more second packets of data of a second type of data to communicate to the device via radio frequency (RF) transmission, wherein the one or more second packets of data of the second type of data is associated with critical communications;

utilizing an optical transmitter of the plurality of optical transmitters to transmit the one or more first packets of data of the first type of data to the device via optical transmission; and utilizing an antenna element of the plurality of antenna elements to transmit the one or more second packets of data of the second type of data to the device via RF transmission.

2. The system according to claim 1, wherein the first indication, at the first time, is communicated from the device using radio frequency (RF) transmission.

3. The system according to claim 1, wherein the first indication comprises a specified wavelength for optical transmission.

4. The system according to claim 1, wherein the radio frequency (RF) transmission utilizes a 5G wireless communication protocol, a 6G wireless communication protocol, or a combination thereof.

5. The system according to claim 1, wherein the operations further comprise: receiving a second indication, at a second time, that the device is not capable of receiving data via optical transmission.

6. The system according to claim 5, wherein the second indication, at the second time, is communicated from the device using radio frequency (RF) transmission.

7. The system according to claim 5, wherein the utilizing the antenna element of the plurality of antenna elements to transmit one or more second packets of data to the device via radio frequency (RF) transmission is performed in response to the receiving the second indication.

8. The system according to claim 5, wherein, at the second time, the device is in a different location than at the first time.

9. The system according to claim 8, wherein, at the second time, the device does not have a direct or substantially direct line of sight to the at least one optical array.

10. The system according to claim 1, wherein, during the utilizing the optical transmitter of the plurality of optical transmitters to transmit one or more first packets of data to the device via optical transmission, and during the utilizing the antenna element of the plurality of antenna elements to transmit one or more second packets of data to the device via radio frequency (RF) transmission, the device is positioned in substantially the same location.

11. The system according to claim 1, wherein the one or more first packets of data of the first type of data are associated with a video download, picture download, audio download, website browsing, or a combination thereof.

12. The system according to claim 1, wherein the one or more second packets of data of the second type of data are associated with a voice call, text messaging, live video, or a combination thereof.

13. The system according to claim 1, wherein the optical transmitter comprises a laser.

14. A method for providing wireless communications for a device, the method comprising:

receiving a first indication, at a first time, that a device is capable of receiving data via optical transmission and including information identifying a type of data communication requested by the device;

based on the type of data requested by the device, (1) determining that one or more first packets of data of a first type of data are to be communicated to the device via optical transmission and (2) determining that one or more second packets of data of a second type of data are to be communicated to the device via radio frequency (RF) transmission;

utilizing an optical transmitter to transmit the one or more first packets of data of the first type of data to the device via optical transmission, wherein the one or more second packets of data of the first type of data are associated with non-critical communications; and utilizing an antenna element to transmit the one or more second packets of data of the second type of data to the device via RF transmission, wherein the one or more second packets of data of the second type of data are associated with critical communications.

15. The method according to claim 14, further comprising: receiving a second indication, at a second time, that the device is not capable of receiving data via optical transmission, and wherein the utilizing the antenna element to transmit one or more second packets of data occurs subsequent to the receiving the second indication.

16. The method according to claim 14, wherein the first indication, at the first time, is communicated from the device using radio frequency (RF) transmission.

17. The method according to claim 14, wherein the first indication comprises a specified wavelength for optical transmission.

18. The method according to claim 14, wherein the device comprises two or more optical receivers, and wherein the two or more optical receivers comprise at least one camera.

19. The method according to claim 14, wherein the one or more first packets of data of the first type of data are associated with a video download, picture download, audio download, website browsing, or a combination thereof, and wherein the one or more second packets of data of the second type of data are associated with a voice call, text messaging, live video, or a combination thereof.

20. The method according to claim 14, wherein, at the second time, the device is in a different location than at the first time, and, wherein, at the second time, the device does not have a direct or substantially direct line of sight to the optical transmitter.

* * * * *